W. A. TURBAYNE.
ELECTRICAL SYSTEM OF DISTRIBUTION.
APPLICATION FILED JULY 8, 1916.

1,260,480.

Patented Mar. 26, 1918.
3 SHEETS—SHEET 2.

Inventor
William A. Turbayne.

Witnesses
David H. Tinkler
Ralph Munden

By Raymond N. Van Vliet
Attorney

W. A. TURBAYNE.
ELECTRICAL SYSTEM OF DISTRIBUTION.
APPLICATION FILED JULY 8, 1916.

1,260,480.

Patented Mar. 26, 1918.
3 SHEETS—SHEET 3.

Witnesses
David H. Tinkler

Inventor
William A. Turbayne
By Raymond H. Van Kirk
Attorney

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

ELECTRICAL SYSTEM OF DISTRIBUTION.

1,260,480. Specification of Letters Patent. Patented Mar. 26, 1918.

Application filed July 8, 1916. Serial No. 108,238.

*To all whom it may concern:*

Be it known that I, WILLIAM A. TURBAYNE, a citizen of the United States, residing at Niagara Falls, in the county of Niagara and State of New York, have invented new and useful Improvements in Electrical Systems of Distribution, of which the following is a specification.

The present invention relates to improvements in electrical systems of distribution.

In many systems of electrical distribution a constant potential source is provided to supply a lighting circuit and at the same time, a widely fluctuating load. Such systems are employed in office buildings where a constant voltage source supplies the lights and also the electric elevators. It is, of course, very desirable that the lights shall be free from undesirable fluctuations. In order that the uncertain heavy demands imposed by the elevator motors shall not reflect back on the lighting circuit, it is customary to connect the lights across the constant voltage source and to interpose a booster of special type between the lighting circuit and the fluctuating load. The booster is so located that only current of a substantially constant value may pass through its armature, any excess demand of the load being supplied by a storage battery, which is connected across the fluctuating load circuit. The desired regulating means is so arranged that only a current equal to the average current requirement of the load and a small additional amount necessary to maintain the battery in charged condition may pass therethrough. Should the demand of the fluctuating load exceed this predetermined constant value, the regulating means will cause the booster to develop an E. M. F. causing a drop in voltage between the constant voltage source and the load, thereby causing the battery to discharge and supply the excess demand.

Systems of this type which have been employed have necessarily involved starting switches, a protective circuit breaker and starting resistances, all distinct from similar devices included in circuit with the booster.

An object of the present invention is to provide a booster system which will instantaneously respond to circuit conditions.

Another object of the present invention is to provide a booster system which will be protected from overload but from which complicated instrumentalities are omitted.

Further objects will be apparent as the description proceeds.

In some of its features, the present invention is similar to the invention disclosed in my co-pending application Serial No. 752,866, filed March 8, 1913, for electrical systems of distribution.

Referring to the drawings.

Figure 1:
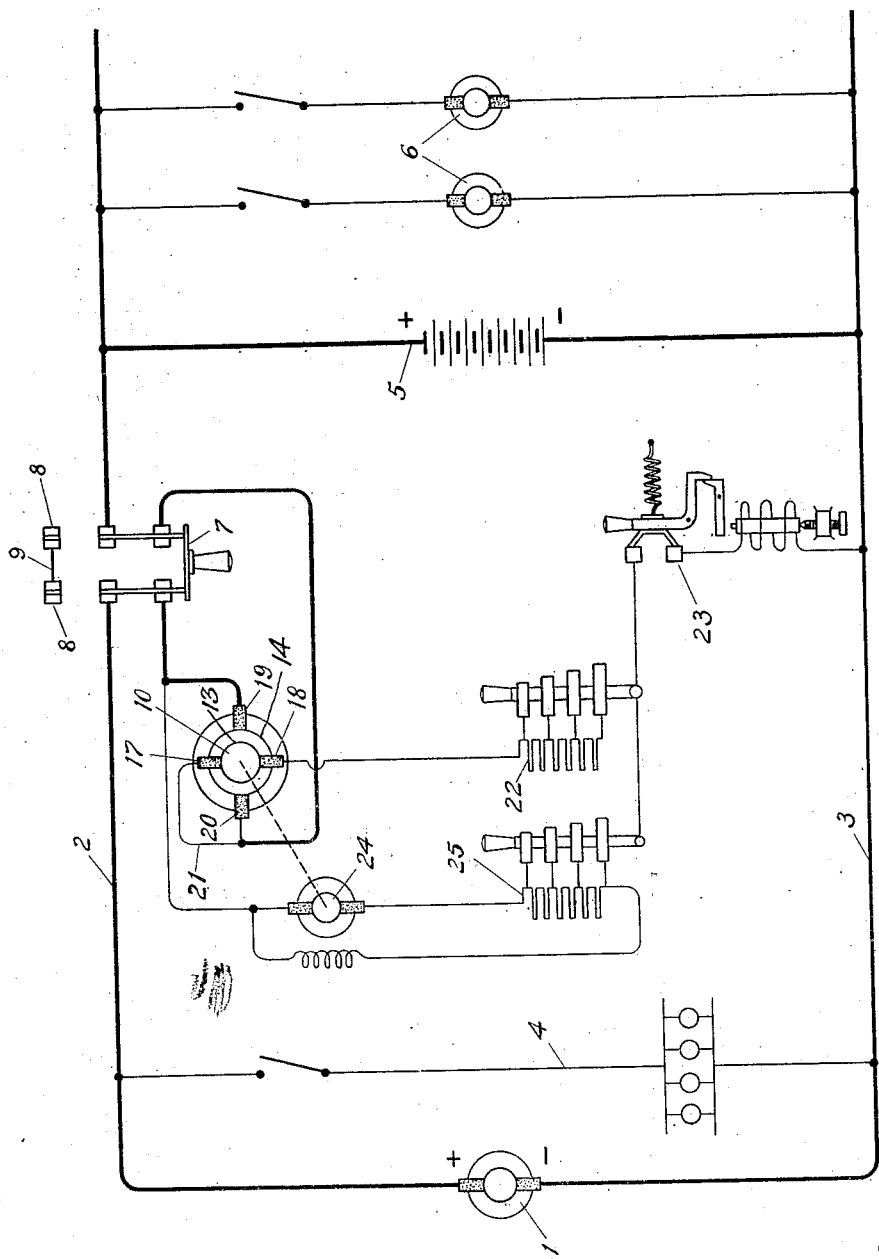
Figure 1 represents diagrammatically one embodiment of the present invention.

Referring first to Fig. 1, the numeral 1 indicates a source of electro-motive force which may be regulated in any desired manner to produce a substantially constant voltage. Said source 1 is adapted to supply mains 2 and 3, across which may be connected the lighting circuit 4, a storage battery 5 and translating devices 6, which translating devices may be motors or any other translating devices taking a highly fluctuating load. The number of cells in the storage battery 5 are so chosen that the battery will neither charge nor discharge at the normal voltage of the source. The regulating booster may be connected in series in the lead 2, between the lamp circuit and the storage battery. Connected in the main 2 between the lamp circuit and storage battery is a double pole double throw switch 7 which, in its upper position, is adapted to contact with stationary contacts 8 which are electrically connected by a conductor 9 of practically zero resistance. When said switch 7 is in its lower position, it will throw in circuit in the main 2 the booster 10.

Figure 2:
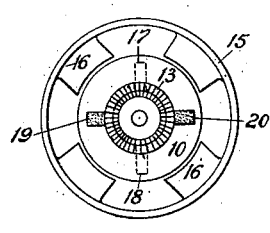
Figs. 2 and 3 represent respectively an end view and a vertical section diagrammatically illustrating the booster machine used in the present invention.
Figure 3:
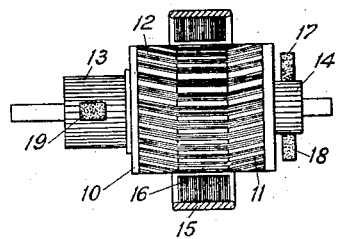

The booster 10, shown more in detail in Figs. 2 and 3, is provided with two distinct armature windings 11 and 12, each connected with the commutators 13 or 14 in the usual manner. The armature revolves within the yoke 15, preferably of iron or steel, provided with pole pieces 16, but with no windings. The purpose of the pole pieces is simply to complete the magnetic circuit for the flux set up by current flowing through the armature windings. This purpose may be served by a continuous ring without definite polar projections, but such a structure would give rise to undesirable sparking at the brushes. To provide neutral spaces to insure good commutation and sparkless operation of the brushes, the external ring is cut away as illustrated, forming the pole pieces.

The armature winding 11 is of comparatively high resistance. It is connected by brushes 17 and 18 across the load circuit, when the switch 7 is in its lower position. The armature winding 12 is of comparatively low resistance and is connected by brushes 19 and 20 in series with the lead 2.

It will be noted in Fig. 1 that brushes 17 and 20 are short circuited by a conductor 21. It will also be noted that brush 18 is connected to the main 3 through the variable resistance 22 and the overload circuit breaker 23. The circuit by which the high resistance armature winding 11 is connected across the mains 2, 3, extends from the right hand blade of the switch 7 through the conductor 21, brush 17, winding 11, brush 18, variable resistance 22 and overload circuit breaker 23.

The booster 10 may be driven by any desired means, as for example, by the motor 24, which is shown as connected across the mains 2, 3, through the switch 7, the starting resistance 25 and the overload circuit breaker 23.

The booster 10 possesses in equal degree both generator and motor functions. Only a small motor is required, necessary to drive the booster against friction and iron losses. The current therefore, passing through this small motor, is of constant value, regardless of variations of current through the booster. Upon the passage of current through the armature winding 12, connected through brushes 19 and 20, a magnetic flux will be developed having a symmetry axis in line with these brushes, and upon rotation of the armature, an E. M. F. will be developed across brushes 17 and 18 at right angles to this flux axis. The windings are so proportioned that with the passage of the predetermined desired constant current through the winding 12, the E. M. F. developed across brushes 17 and 18 will be just equal to the E. M. F. of the source 1, so that no current will flow in the armature winding between said brushes 17 and 18. The voltage across the load circuit will therefore be equal to the voltage of the source and the battery 5 will just float across the line.

Increase of current through brushes 19 and 20 due to an increase in demand by the translating devices 6 will cause the E. M. F. developed across brushes 17 and 18 to predominate over the E. M. F. across the mains 2, 3, with the result that a current will circulate in the armature between brushes 17 and 18, which will develop an E. M. F. across brushes 19 and 20 in a direction to oppose the E. M. F. of the source 1, causing therefore a reduction in voltage across the fluctuating load circuit. Under these conditions, the battery will discharge into the load circuit to meet the excess demand.

A decrease of current from brushes 19 and 20 below the normal demand will, of course, result in the E. M. F. across brushes 17 and 18 falling below that of the source 1, with the result that current will circulate in the armature winding between brushes 17 and 18 in the opposite direction. This will develop an E. M. F. across brushes 19 and 20 in a direction to assist the E. M. F. of the source, thus causing the charging current to flow to the battery.

The result under either condition is to tend to hold the current flowing between brushes 19 and 20 to a substantially constant normal value. If, however, for any reason, such for instance, as in case the battery should become open-circuited, the variations of current through brushes 19 and 20 should become excessive, abnormal values of current will also flow in the armature winding 11 connected with the brushes 17 and 18. To guard against any mishap arising from such a contingency, the circuit breaker 23 is provided. As the current through the small driving motor 24 is a constant quantity, it is necessary only to adjust the circuit breaker 23 so that it will carry the small motor circuit plus the permissible maximum through the booster regulating brushes 17 and 18 and will trip open when this current value is exceeded. It will be apparent that the normal value of the current permitted to flow through the booster may be varied by varying the effect of the winding 11 which is connected across the mains 2, 3, through the brushes 17 and 18. For this purpose the variable resistance 22 is provided. By manipulation of the resistance 22 the degree of regulation imparted by the booster may be modified, a portion of the current demanded by the fluctuating load being supplied from the generating source. As explained above, any departure from the normal value of current through the booster causes a current to flow through the winding 11 connected to the regulating brushes 17 and 18 which will be directly proportional to the value of current in excess of or under that of the normal value. Therefore, by inserting more or less resistance in circuit with said winding 11, the regulating properties of the booster will be modified in such a manner that more or less of the extra demand will be supplied from the generator 1, depending upon the amount of resistance included in circuit.

Figure 4:
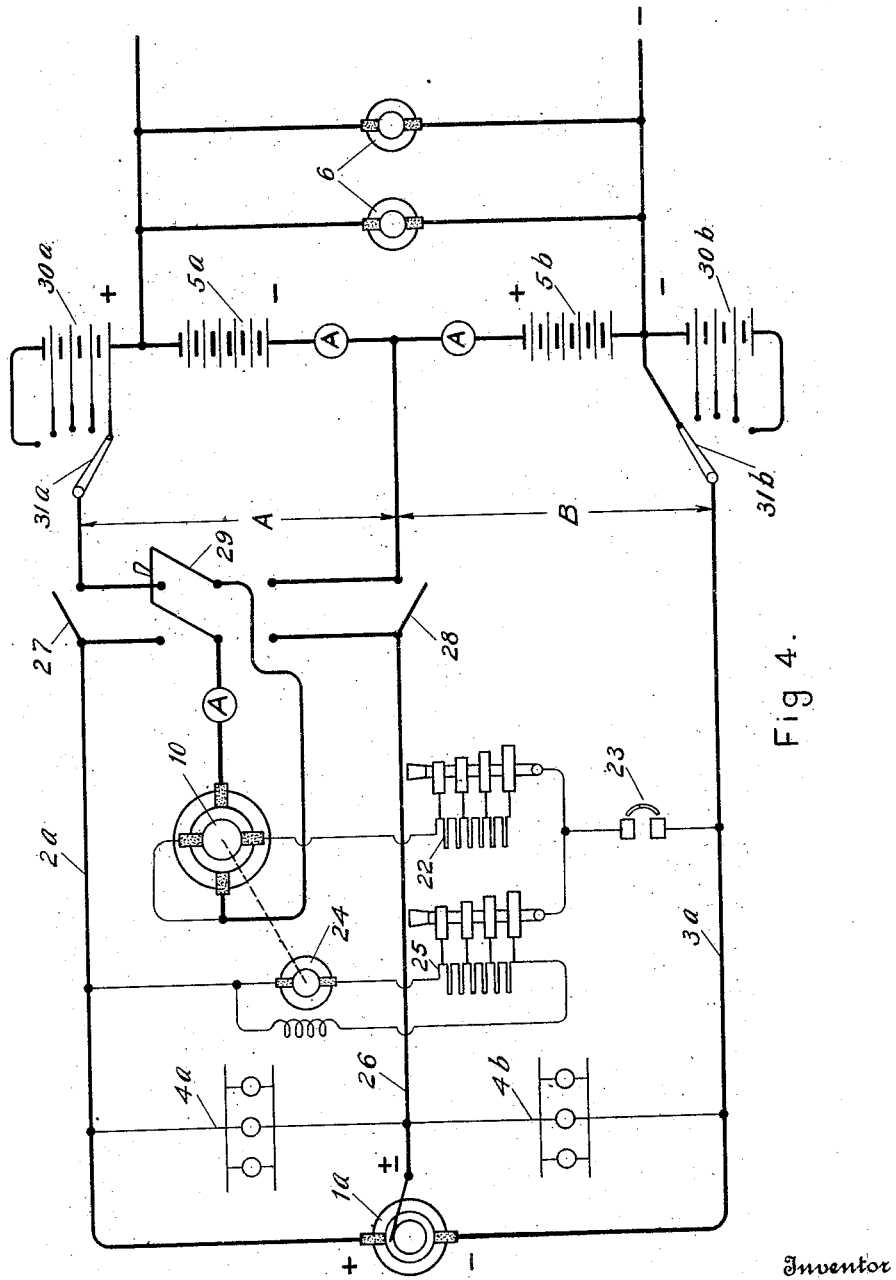
Fig. 4 represents diagrammatically a modified form of the present invention involving a three-wire system of distribution.

Fig. 4 shows the development of the system disclosed in Fig. 1, in which the inventive idea of Fig. 1 is embodied in a system which may be either a 2-wire system or a 3-wire system, depending upon the operation of certain manually operable switches. In Fig. 4 a 3-wire generator 1$^a$ is disclosed, which feeds the main leads 2$^a$ and 3$^a$. The light circuit is composed of two circuits 4$^a$ and 4$^b$, connected to the neutral wire 26, which is connected to the neutral point of the 3-wire generator 1$^a$. The battery is divided into two sections, 5$^a$ and 5$^b$, the battery section 5$^a$ being connected between the main lead 2$^a$ and the neutral wire 26, and the battery section 5$^b$ being connected between the lead 3$^a$ and the neutral wire 26. The translation devices which are adapted to take a widely fluctuating load, are shown as electric motors 6, connected across the main leads 2$^a$ and 3$^a$. A booster 10 is provided which has the same characteristics as the booster 10 described in connection with Fig. 1. As in Fig. 1, said booster 10 is adapted to be driven by the electric motor 24. In series in the lead 2$^a$ is a manually operable switch 27 and in series in the neutral lead 26 is a manually operable switch 28. A double pole double throw switch 29 is provided across the middle terminals to which are connected the main brushes 19 and 20 of the booster 10. As will be apparent from an inspection of Fig. 4, when the double pole double throw switch 29 is thrown to its upper position, the switches 27 and 28 being open, the system disclosed in Fig. 4 is identical with the system disclosed in Fig. 1. Should the battery section 5$^a$ become discharged to a greater extent than the battery section 5$^b$, said battery section 5$^a$ may be charged independently of the battery section 5$^b$ by throwing the double pole double throw switch 29 to its upper position, opening the switch 27 and closing the switch 28. Conversely, should the battery section 5$^b$ become discharged to a greater extent than the battery section 5$^a$, said battery section 5$^b$ may be charged independently of the other battery section by throwing the double pole double throw switch 29 to its lower position and opening the switch 28. It will be evident, therefore, that by proper manipulation of the switches 27, 28, and 29, the system disclosed in Fig. 1 may be operated as a plain 2-wire system without a booster or as a 2-wire system with a booster, or as a 3-wire system with or without the booster. It will be evident also, that when the booster is used to charge either battery section, the value of the charging current may be controlled by manipulation of the variable resistance 22. Each of the battery sections may be provided with end cells 30$^a$ and 30$^b$ and an end cell switch 31$^a$ and 31$^b$, whereby the battery sections may supply the lights at the proper voltage when the generator is not operating.

The construction of the switch 23 in Fig. 4 may be the same as the circuit breaker 23 disclosed in Fig. 1. The details of said circuit breaker have not been shown in Fig. 4, such showing being unnecessary in view of the showing in Fig. 1. It will be evident in case a current heavier than the maximum desired current should, for any reason, flow through the armature 11 of the booster, the circuit breaker 23 will trip, opening circuit through said armature 11 and through the electric motor 24.

It is obvious that many modifications may be made in the disclosure without departing from the inventive idea. It is desired to cover in this case all such modifications that fall within the scope of the invention as defined by the appended claims.

Having described my invention, what I claim as new and desire to secure by Letters Patent of the United States, is:—

1. The combination, in a system of electrical distribution, of a load circuit, a generator and a battery, each connected across leads of said load circuit and a dynamo-electric machine provided with armature windings connected in series between said generator and battery and provided with armature windings connected across said load circuit, and means for varying the effect of said last mentioned windings.

2. In a system, two circuits between which there is a variable difference in voltage, means for causing a substantially constant current to flow therebetween, said means comprising a dynamo-electric machine having two sets of brushes spaced substantially ninety electrical degrees apart and having a portion of its armature windings connected by brushes in series between said circuits and a portion of its armature windings connected across said circuits by the other set of said brushes, and means for varying the effect of said last mentioned portion.

3. In combination, a constant potential source, a fluctuating load, an auxiliary source and a dynamo-electric machine connected between said sources, said dynamo-electric machine having two sets of brushes spaced substantially ninety electrical degrees apart and having certain of its armature windings connected by one set of said brushes in series between said sources and also having certain of its armature windings connected across said fluctuating load by the other set of brushes, and means for varying the effect of the armature windings connected to said last mentioned set of brushes.

4. In an electrical system of distribution, a constant potential source, a lighting circuit connected across said source, a fluctuating load circuit, a storage battery connected across said load circuit, and a constant current booster, said booster being provided with armature windings and also provided with a set of brushes connecting certain of said armature windings across said fluctuating load and with a set of brushes connecting certain of said armature windings in series between said lighting circuit and said fluctuating load circuit.

5. In an electrical system of distribution, a constant potential source, a lighting circuit connected across said source, a fluctuating load circuit, a storage battery connected across said load circuit, a constant current booster, said booster being provided with armature windings and also provided with a set of brushes connecting certain of said armature windings across said fluctuating load and with a set of brushes connecting certain of said armature windings in series between said lighting circuit and said fluctuating load circuit, and means for varying the effect of said last mentioned armature windings.

6. In an electrical system of distribution, a constant potential source, an auxiliary source, a fluctuating load circuit, and a constant current booster for determining the amount of load carried by each source, said booster having armature windings connected across said fluctuating load circuit, said booster also having armature windings connected in series between said sources.

7. In an electrical system of distribution, a constant potential source, an auxiliary source, a fluctuating load circuit, a constant current booster for determining the amount of load carried by each source, said booster having armature windings connected across said fluctuating load circuit, said booster also having armature windings connected in series between said sources, and means for varying the effect of said last mentioned armature windings.

8. In a system of electrical distribution, a constant potential source, a load circuit connected across said source, a second load circuit, and a constant current booster, said booster having armature windings connected across said second load circuit and said booster also having armature windings connected in series between said load circuits.

9. In a system of electrical distribution, a constant potential source, a load circuit connected across said source, a second load circuit, a constant current booster, said booster having armature windings connected across said second load circuit and said booster also having armature windings connected in series between said load circuits, and means for varying the effect of said last mentioned armature windings.

10. In an electrical system of distribution, a constant potential source, a widely fluctuating load, an auxiliary source connected across said load, and a regulating dynamo-electric machine for determining the proportion of load carried by each source, said dynamo-electric machine being free of field windings, said dynamo-electric machine having armature windings connected in series between said sources and other armature windings connected across said fluctuating load.

11. In an electrical system of distribution, a constant voltage source, an auxiliary source, a variable load supplied by said sources, and a booster for determining the proportion of load carried by each source, said booster having armature windings connected in series between said sources and other armature windings connected across said load, said booster being regulated solely by armature current whereby the regulating action of said booster is in absolute time relation with fluctuations in current from said sources.

12. In an electrical system of distribution, a constant voltage source, a fluctuating load, an auxiliary source connected across said load, and a regulating booster for determining the proportion of load carried by each source, said booster being provided with two sets of brushes, the armature of said booster being connected to one set of said brushes across said flctuating load, and the armature of said booster also being connected to the other set of said brushes in series between said sources.

13. In an electrical system of distribution, a constant potential source, a fluctuating load and a regulating booster, said booster being provided with a pair of brushes connecting windings of the armature of said booster across said load, said booster being also provided with a pair of brushes connecting windings of the armature of said booster in series with said source, said winding being so proportioned that a predetermined current through said series brushes will develop an E. M. F. across said first pair of brushes exactly equal and opposite to the E. M. F. of said source, whereby a decrease in said predetermined current will cause said source to send a current through said first pair of brushes in one direction and an increase in said predetermined current will cause the E. M. F. across the first pair of brushes to predominate over the E. M. F. of said source.

14. In an electrical system of distribution, a constant potential source, a fluctuating load and a regulating booster, said booster being provided with a pair of brushes connecting windings of the armature of said booster across said load, said booster being also provided with a pair of brushes connecting windings of the armature of said booster in series with said source, said windings being so proportioned that a predetermined current through said series brushes will develop an E. M. F. across said first pair of brushes exactly equal and opposite to the E. M. F. of said source, whereby a decrease in said predetermined current will cause said source to send a current through said first pair of brushes in one direction and an increase in said predetermined current will cause the E. M. F. across the first pair of brushes to predominate over the E. M. F. of said source, and means for varying the effect of said first mentioned armature windings.

15. The combination, in a system of electrical distribution, of a load circuit, a generator and a battery, each connected across leads of said load circuit, and a dynamo electric machine provided with armature windings connected in series between said generator and battery and provided with armature windings connected across said load circuit, electrical driving means for said dynamo-electric machine and common protecting means for said electrical driving means and said second mentioned armature windings.

16. In a system, in combination, two circuits between which there is a variable difference in voltage, booster means in series between said circuits for maintaining a constant current flow therebetween, controlling means for said booster means connected across one of said circuits, electrical driving means for said booster and common protective means for said driving means and said controlling means.

17. In a system, in combination, two circuits between which there is a variable difference in voltage, booster means in series between said circuits for maintaining a constant current flow therebetween, electrical controlling means for said booster means connected across one of said circuits, an electric motor for driving said booster means, circuit through said motor and said controlling means being controlled by a single protective device.

18. In a system, in combination, a constant voltage source, a fluctuating load circuit, a battery across said load circuit adapted to be divided into two sections, a conductor whereby the midpoint between said sections may be connected to said source to constitute a three-wire system, booster means in series between said source and said load circuit to maintain a substantially constant current flow therebetween, and switching means whereby said system may operate as a two-wire system with or without a booster or as a three-wire system with or without a booster.

19. In a system, in combination, a constant voltage source, a fluctuating load circuit, a battery across said load circuit adapted to be divided into two sections, a conductor whereby the midpoint between said sections may be connected to said source to constitute a three-wire system, booster means in series between said source and said load circuit to maintain a substantially constant current flow therebetween, and switching means whereby said booster means may be used in charging either battery section.

20. A three-wire system involving, in combination, a constant voltage source, main leads and a neutral lead, battery sections between each main lead and the neutral lead, a fluctuating load circuit across said main leads, booster means for maintaining substantially constant the current flow from said source, and switching means whereby said booster means may be used to charge either battery section at will.

In witness whereof, I have hereunto subscribed my name.

WILLIAM A. TURBAYNE.

Copies of this patent may be obtained for five cents each, by addressing the "Commissioner of Patents, Washington, D. C."